United States Patent [19]
Cuschera

[11] Patent Number: 4,873,730
[45] Date of Patent: Oct. 17, 1989

[54] DISENGAGABLE RING FITTING FOR A TOILET

[76] Inventor: Casper Cuschera, 1047 - 77th Ave., Oakland, Calif. 94621

[21] Appl. No.: 787,040

[22] Filed: Oct. 15, 1985

[51] Int. Cl.$^4$ ............................................. E03D 11/00
[52] U.S. Cl. ...................................... 4/252 R; 285/56
[58] Field of Search ................... 4/252 R; 285/56, 60

[56] References Cited
U.S. PATENT DOCUMENTS

| | | | |
|---|---|---|---|
| 1,044,457 | 11/1912 | Jaeger | 285/60 |
| 1,112,360 | 9/1914 | Crosby | 285/56 |
| 1,149,269 | 8/1915 | Klindt | 4/252 X |
| 3,319,268 | 5/1967 | Blumenkranz | 4/252 |
| 3,775,780 | 12/1973 | McEwen | 4/252 R |
| 4,090,267 | 5/1978 | Cuschera | 4/288 |

Primary Examiner—Charles E. Phillips
Attorney, Agent, or Firm—Harris Zimmerman; Howard Cohen

[57] ABSTRACT

A fitting for securing the base of a toilet or the like to a floor and which also couples the toilet to a drain pipe includes a ring and a sleeve which are normally held together in coaxial relationship but which can be disengaged, if necessary, for such purposes as replacing one sleeve with another of different length. The sleeve fits on the end of the drain pipe while the ring has passages through which fasteners may extend to secure the ring to the floor and to secure the toilet to the ring. The inner edge of the ring extends between a flange and spaced apart projections on the sleeve to fasten the two elements together in coaxial relationship while enabling turning of the ring, after the sleeve has been bonded to the drain pipe, to align the fastener passages of the ring with those of the toilet. Notches in the inner edge of the ring enable the two elements to be separated, if necessary, by turning the ring to bring the notches and sleeve projections to the same locations.

10 Claims, 1 Drawing Sheet

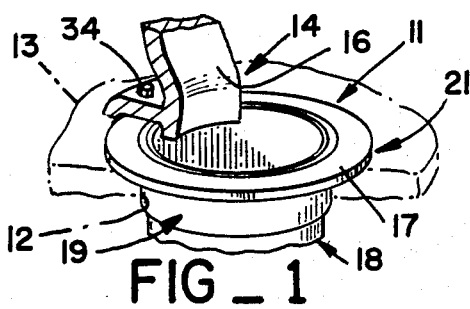
FIG_1
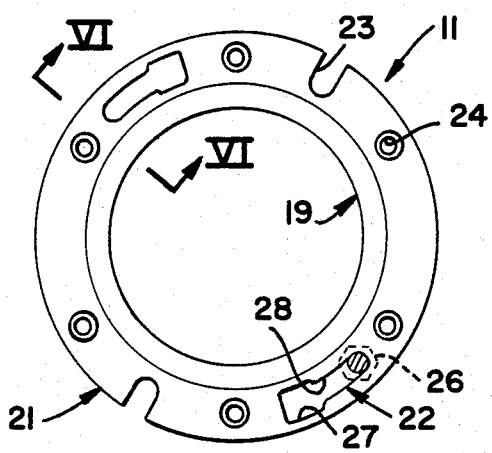
FIG_2
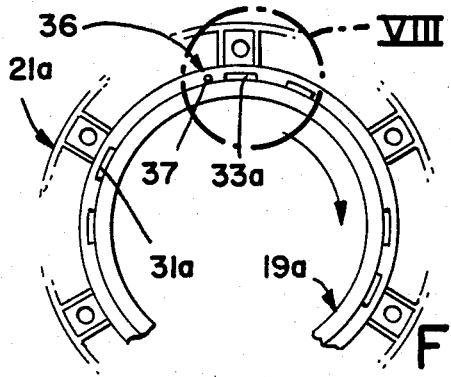
FIG_7
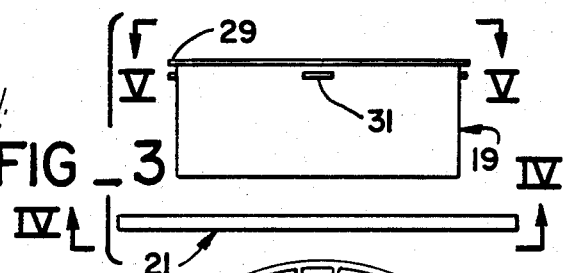
FIG_3
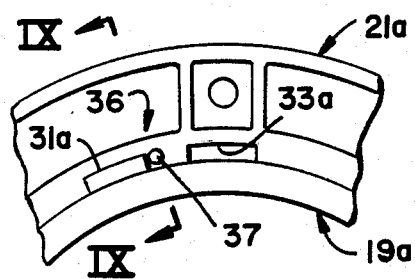
FIG_8
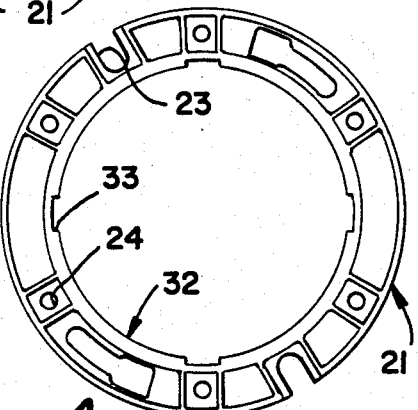
FIG_4
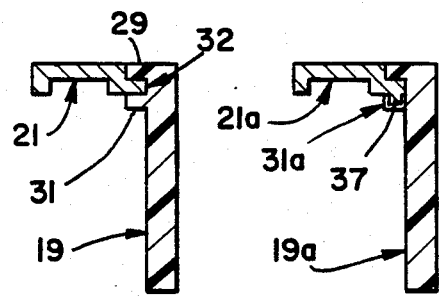
FIG_6  FIG_9
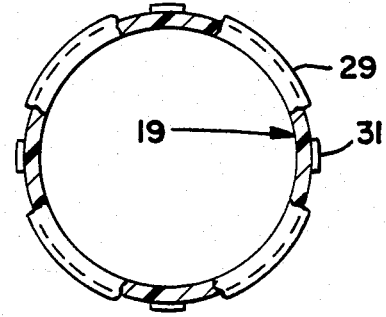
FIG_5

DISENGAGABLE RING FITTING FOR A TOILET

TECHNICAL FIELD

This invention relates to plumbing fittings and more particularly to ring fittings for coupling the base of a toilet or the like to a floor and to a drain pipe at an opening in the floor.

BACKGROUND OF THE INVENTION

Toilets and certain other plumbing fixtures are usually situated over an opening in a floor into which the upper end of a drain pip extends. A ring fitting at the base of the toilet serves the dual purposes of securing the toilet to the floor and coupling the waste discharge passage of the toilet to the drain pipe.

In the more or less standardized construction, the ring fitting includes a cylindrical sleeve element which engages on the upper end of the drain pipe and a coaxial ring element disposed against the floor around the drain opening and having an inner edge which extends under a flange formed on the upper end of the sleeve. Passages are provided in the ring element for screws or the like which secure the fitting to the floor and for bolts or the like which extend upwardly to secure the base of the toilet to the fitting. In modern ring fittings of this kind, the sleeve element is typically formed of plastic which can be bonded to a plastic drain pipe with solvents to provide a sealed, positive connection between the fitting and drain pipe. The ring element is typically metal to provide a high strength fastening of the toilet to the floor.

Bonding of the sleeve element to the drain pipe may occur very quickly and thereafter the ring fitting cannot be turned as a unit in order to bring the bolt holes of the fitting into precise alignment with those of the toilet itself. To enable such alignment without disrupting the bonding of the sleeve to the drain pipe, the ring element is not rigidly fastened to the sleeve and can be rotated until such time as it is screwed to the floor.

Some prior constructions provide for such rotation by employing ring and sleeve elements that are not directly attached to each other in any manner. The two elements are separable. Such separability is advantageous in certain respects as it enables a particular ring element to be matched with a selected one of a number of sleeves of different length and configurations as the requirements of a particular job might dictate. However, the above described construction does not inherently maintain the sleeve and ring elements in a strictly coaxial relationship with each other. Consequently, installation may become difficult and subject to error, particularly if the drain pipe is slightly mispositioned as is a common occurrence, as the sleeve may tend to move out of precisely coaxial relationship with the ring as it bonds to the drain pipe.

Such installation problems are avoided by another prior construction in which the ring and sleeve elements are permanently joined together while still being relatively rotatable. The inner edge of the ring extends into a groove on the outer surface of the sleeve defined by the flange at the upper end of the sleeve and outward extending projections on the sleeve immediately below the ring. This maintains the sleeve and ring elements in strict coaxiality but the construction is also disadvantageous in certain respects. It is not possible to replace the sleeve with one of a different length or configuration when conditions at a particular job site make that desirable.

A construction which enables interchanging of a variety of sleeve elements at a particular ring element while also acting to inherently maintain the two elements in optimum alignment during installation would be very advantageous.

The present invention is directed to overcoming one or more of the problems discussed above.

SUMMARY OF THE INVENTION

In one aspect of the present invention, a fitting for coupling the base of a toilet or the like to a floor and to a drain pipe has a cylindrical sleeve proportioned for engagement on the upper end of the drain pipe in coaxial relationship with the drain pipe, the sleeve having a flange at the upper end. A ring is disposed at the upper end of the sleeve in coaxial relationship with the sleeve, the ring having passages through which fasteners may be extended to couple the ring to a floor and to couple the toilet base to the ring and also has an inner edge which extends beneath the flange of the sleeve. The ring has a plurality of notches which are at spaced apart locations around the inner edge of the ring. A plurality of ring retainer projections extend radially outward from the sleeve beneath the inner edge of the ring, the projections being at locations around the circumference of the sleeve that are spaced apart by distances corresponding to the spacing of the notches around the inner edge of the ring. The projections are proportioned to pass through the notches to enable separation of the ring from the sleeve when the ring is rotated to bring the notches and projections to the same locations.

In another aspect, the invention provides a ring fitting for securing the base of a toilet or the like to a floor and for coupling the toilet or the like to a drain pipe at the floor which includes, in combination, a plastic cylindrical sleeve having an integrally formed flange at one end and a plurality of outwardly extending projections spaced apart around the outer surface of the sleeve and spaced apart from the flange. At least the lower end of the sleeve is proportioned to engage on the end of the drain pipe in coaxial relationship with the pipe. A metal ring is disposed in coaxial relationship with the sleeve and has an annular inner edge extending into the space between the flange and projections of the sleeve, the ring being transpierced by a plurality of passages through which fasteners may extend to secure the ring to the floor and to secure the base of the toilet to the ring. The ring further has a plurality of notches in the inner edge which are spaced apart by distances corresponding to the spacing of the projections on the sleeve and which are of sufficient size to enable the projections to pass through the notches when the ring is turned relative to the sleeve to bring the notches to the locations of the projections.

The invention inherently holds the ring and sleeve in the desired orientation relative to each other during installation but also enables separation of the components when that is desirable for such purposes as replacing a particular sleeve with another of different configuration. Installation operations are simplified and faulty installations are avoided.

BRIEF DESCRIPTION OF THE DRAWINGS

FIG. 1 is a perspective view of a first embodiment of the invention as it appears when installed at the base of a toilet or the like.

FIG. 2 is a plan view of the embodiment of the invention depicted in FIG. 1.

FIG. 3 is an exploded side view of the ring fitting of the preceding figures showing the components separated.

FIG. 4 is a bottom view of one of the components shown in FIG. 3 taken along line IV—IV thereof.

FIG. 5 is a broken out plan view of another of the components shown in FIG. 3 taken along line V—V thereof.

FIG. 6 is a partial cross section view of the first embodiment of the invention taken along line VI—VI of FIG. 2.

FIG. 7 is a partial bottom view of a ring fitting in accordance with a second embodiment of the invention.

FIG. 8 is an enlargement of the portion of FIG. 7 encircled by dashed line VIII thereon but with components shown in a moved position relative to each other.

FIG. 9 is a cross section view taken along line IX—IX of FIG. 8.

DESCRIPTION OF THE PREFERRED EMBODIMENTS

Referring initially to FIG. 1 of the drawing, a ring fitting 11 in accordance with a first embodiment of the invention is utilized at a drain opening 12 in a floor 13 to secure the base 14 of a toilet or similiar plumbing appliance to the floor. The fitting 11 also functions to connect the waste flow channel 16 of the toilet 14 with the upper end 17 of a drain pipe 18 which extends into floor opening 12. Only fragments of toilet 14, floor 13 and drain pipe 18 are depicted in the drawing as such structures may be of conventional construction.

Fitting 11 includes a cylindrical connector or sleeve element 19 proportioned to be fitted onto the drain 18 and a ring element 21 disposed in coaxial relationship with the upper end of the sleeve and having an outside diameter greater than the diameter of the floor opening 12. Although not essential in all instances, sleeve 19 is preferably formed of a plastic such as polyvinyl chloride, for example, similar to the materials of which drain pipes 18 are made in modern plumbing systems. This enables bonding of the sleeve 19 to drain pipe 18, to seal the joint, by applying plastic solvents of known composition to the contacting surfaces of the two elements. Ring 21 is preferably formed of metal, such as brass for example, to provide a high strength connection between toilet 14 and floor 13 although other materials can be used in some cases.

Referring now to FIG. 2, ring 21 is transpierced by spaced apart passages 22, 23 and 24 through which bolts 26 may be extended to couple the toilet to the ring in the case of passages 22 and 23 and through which screws (not shown) may be extended to secure the ring to the floor in the case of passages 24. In this example, there are two passages 22 which are situated at diametrically opposite positions on the ring. Each such passage 22 has a slot configuration with one end 27 being large enough to receive the head of the bolt 26 while the opposite end 28 is smaller so that the bolt cannot be withdrawn upwardly when it is positioned at that end. The additional pair of bolt passages 23 are U-shaped indentations in the ring 21 situated at diametrically opposite positions and are provided to accomodate to the type of standardized toilet base that has four mounting bolts. Screw passages 24, of which there are six in this particular example of the invention, are spaced at equal angular intervals around the ring and are preferably countersunk.

As will be recognized by those skilled in the art, the above described fastener passages 22, 23 and 24 are arranged to accomodate to the standardized toilet mountings currently used in the trade. The locations, configurations and number of such passages 22, 23 and 24 may be modified as necessary to accomodate to other toilet base constructions.

Referring now to FIGS. 2 and 5 in conjunction, sleeve 19 has a flange 29 at the upper end and a series of radially outwardly extending projections 31 which are situated a short distance below the flange and which are spaced apart around the circumference of the sleeve. There are four such projections 31 in this example spaced at 90° intervals around the sleeve and each projection has a rectangular configuration although other numbers of projections, spacings and configurations may also be employed.

Referring now to FIGS. 4 and 6 in conjunction, ring 21 has an inner edge 32 which extends into the spaces between the flange 29 and projections 31 of sleeve 19. Edge 32 has a thickness corresponding to the spacing of projections 31 from flange 29. Thus the flange 29 and projections 31 normally act to hold the ring 21 and sleeve 19 together in coaxial relationship but enable rotation of the ring relative to the sleeve which conditions greatly facilitate installation of the fitting 11 and toilet 14 for the hereinbefore discussed reasons.

Referring to FIG. 4 in conjunction with FIG. 2, assembly of the ring fitting 11 and disengagement of the sleeve 19 from ring 21 if that becomes necessary is provided for by a series of notches 33 in the inner edge 32 of the ring. Notches 33 are at least equal in number to the number of projections 31 on sleeve 19 and are spaced apart around the ring edge 32 by distances corresponding to the spacings of the projections on the sleeve. The notches 33 are of sufficient size that the projections 31 may pass through the notches when ring 21 is turned relative to sleeve 19 to bring the notches and projections to the same locations.

Thus the ring fitting 11 is easily assembled by inserting the sleeve 19 into ring 21, turning the ring or sleeve to bring notches 33 and projections 31 to the same angular locations, bringing edge 32 of the ring into abutment with sleeve flange 29 while the projections pass through the notches, and then turning one of the components relative to the other to position the notches and projections at different locations. The ring 21 and sleeve 19 are thus fastened together and fixed in the desired coaxial relationship although, with reference again to FIGS. 1 and 2, the ring may be turned as necessary after bonding of the sleeve 19 to drain pipe 18 to bring the bolt passages 22 into the desired alignment with the corresponding bolt passages 34 of the toilet 14 itself. The ring fitting 11 may be easily disassembled if that becomes necessary by reversing the above described steps.

During assembly of the ring fitting 11 as described above and during any angular adjustment of the ring 21 relative to sleeve 19 during installation of toilet 14, careful attention must be paid to the amount of turning of the ring to assure that notches 33 and projections 21 are not again brought to the same locations. The ring 21 and sleeve 19 would no longer be positively fastened together under that condition. Referring now to FIGS. 7, 8 and 9 in conjunction, a second embodiment of a ring fitting 11a is depicted which has means 36 for limiting turning of the ring 21 which automatically prevents such an occurence.

The second embodiment of the ring fitting 11a may be similar in all respects to the first described embodiment except insofar as the ring 21a is formed with a small stop projection 37, consituting the above mentioned means 36, on the underside. Stop projection 37 is located adjacent one of the notches 33a at a position which it blocks further movement of one of the projections 31a as the projection approaches that notch during turning of the ring 21a relative to sleeve 19a. FIG. 7 illustrates the relative positions of the notch 33a and projection 37 following assembly of the ring fitting 11a including some turning of the ring 21a relative to sleeve 19a to bring the ring and sleeve out of the angular orientation at which the projection were passed through the notches. Further turning eventually causes abutment of projection 31a of the sleeve 19a against stop projection 37 of the ring, as depicted in FIGS. 8 and 9, to block continuation of the turning before the notches and projections are again brought to the same locations.

While the invention has been described with respect to certain specific embodiments or examples, many variations are possible and it is not intended to limit the invention except as defined in the following claims.

I claim:

1. A fitting for coupling the base of a toilet or the like to a floor and to a drain pipe thereat, the fitting having a cylindrical sleeve proportioned for engagement on the upper end of said drain pipe in coaxial relationship thereon and wherein said sleeve has a flange at the upper end, said fitting further including a ring disposed at the upper end of said sleeve in coaxial relationship therewith, the ring having a plurality of passages through which fasteners may be extended to cough said ring to said floor and to couple said toilet base to said ring, said ring being of larger diameter than said flange of said sleeve and having an inner edge which extends beneath said flange, wherein the improvement comprises:

said ring having a plurality of notches in said inner edge thereof, said notches being at spaced apart locations around said inner edge of said ring, and a plurality of ring retainer projections extending radially outwardly from the outer surface of said sleeve beneath said inner edge of said ring, said projections being at locations around the cirumference of said sleeve that are spaced apart by distances corresponding to the spacing of said notches around said inner edge of said ring, said projections being equidistantly spaced from said flange by a distance at least equal to the thickness of said inner edge of said ring to enable movement of said inner edge along the space between said flange and said projections when said ring is rotated to move said notches away from the locations of said projections, said projections being proportioned to pass through said notches to enable separation of said ring from said sleeve when said ring is rotated to bring said notches and projections to the same locations.

2. The fitting of claim 1 wherein said notches in said inner edge of said ring and said projections which extend radially from said sleeve have substantially similar configurations.

3. The fitting of claim 1 wherein said notches are spaced apart around said inner edge of said ring at equal angular intervals therearound and wherein ring retainer projections on said sleeve are equal in number to said notches and are spaced apart around said sleeve at said equal angular intervals.

4. The fitting of claim 1 where said ring retainer projections of said sleeve are spaced from said flange thereof by a distance substantially similar to the thickness of said inner edge of said ring.

5. The fitting of claim 1 wherein said notches in said inner edge of said ring and said ring retainer projections of said sleeve have the same length and are spaced apart around said edge and said sleeve respectively by distances which exceed said length.

6. The fitting of claim 1 further including
means for limiting rotation of said ring relative to said sleeve to an amount of angular travel which exceeds the length of said notches and which is less than the angular spacing of said notches around said inner edge of said ring.

7. The fitting of claim 6 wherein said means for limiting rotation of said ring includes a stop projection extending downward from the underside of said ring in the path of rotational travel of one of said ring retainer projections of said sleeve.

8. The fitting of claim 7 wherein said stop projection is positioned on said underside of said ring at a location adjacent one of said notches thereof.

9. A ring fitting for securing the base of a toilet or the like to a floor and for coupling said toilet or the like to a drain pipe at said floor comprising, in combination:

a plastic cylindrical sleeve having an integrally formed flange at one end thereof and having a plurality of radially outwardly extending projections spaced apart around the outer surface of the sleeve and being equidistantly spaced apart from said flange, at least the lower end of said sleeve being proportioned to engage on the end of said drain pipe in coaxial relationship therewith, and a metal ring disposed on said sleeve in coaxial relationship therewith, said ring being of larger diameter than said flange and having an annular inner edge extending into the space between said flange and said projections of said sleeve, said ring being transpierced by a plurality of passages through which fasteners may extend to secure said ring to said floor and to secure said base of said toilet to said ring, said ring further having a plurality of notches in said inner edge thereof which are spaced apart by distances corresponding to the spacing of said projections on said sleeve and which are of sufficient size to enable said projections to pass through said notches when said ring is turned relative to said sleeve to bring said notches to the locations of said projections, said inner edge of said ring being sufficiently thin to enable movement of said inner edge along said space between said flange and said projections when said ring is turned relative to said sleeve to move said notches away from the locations of said projections.

10. A ring fitting as defined in claim 9 further including means for limiting rotation of said ring relative to said sleeve to an amount of angular travel which exceeds the length of said notches and which is less than the spacing of said notches around said inner edge of said ring.

* * * * *